Oct. 14, 1952  O. H. HUSTON  2,614,164
MUTUAL INDUCTANCE SYSTEM
Filed Nov. 12, 1947  3 Sheets-Sheet 1
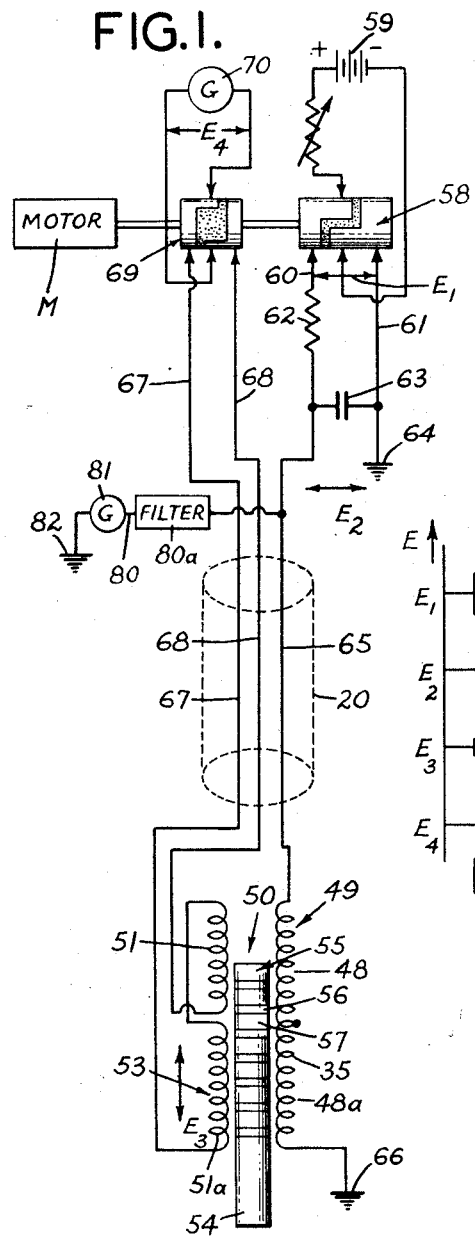
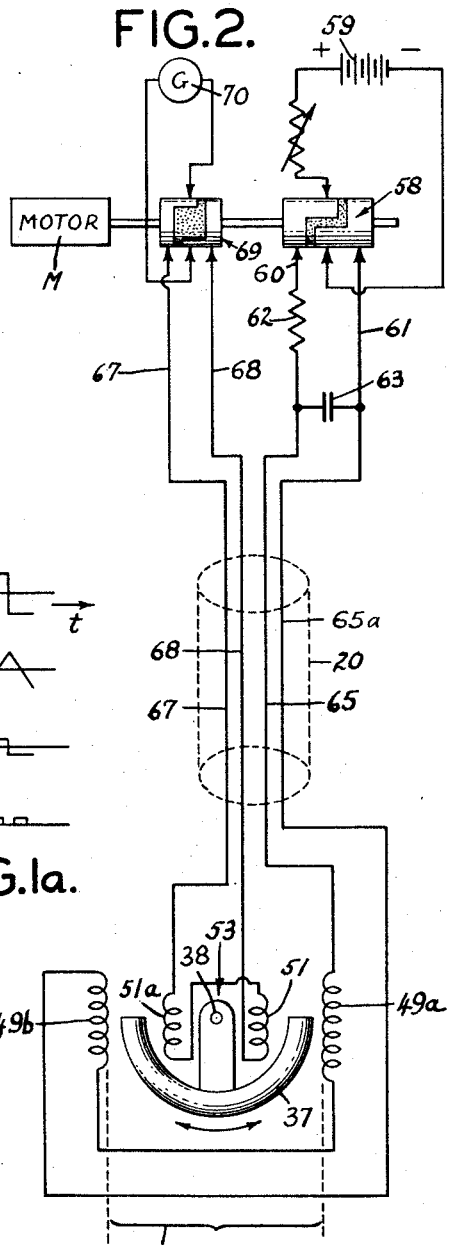
INVENTOR.
OWEN H. HUSTON
BY
Campbell, Brumbaugh & Free
HIS ATTORNEYS.

Oct. 14, 1952 — O. H. HUSTON — 2,614,164
MUTUAL INDUCTANCE SYSTEM
Filed Nov. 12, 1947 — 3 Sheets-Sheet 2

INVENTOR.
OWEN H. HUSTON
BY
Campbell, Brumbaugh & Free
HIS ATTORNEYS.

Oct. 14, 1952 — O. H. HUSTON — 2,614,164
MUTUAL INDUCTANCE SYSTEM
Filed Nov. 12, 1947 — 3 Sheets-Sheet 3

INVENTOR.
OWEN H. HUSTON
BY Campbell, Brumbaugh + Free
HIS ATTORNEYS.

Patented Oct. 14, 1952

2,614,164

UNITED STATES PATENT OFFICE 2,614,164

MUTUAL INDUCTANCE SYSTEM

Owen H. Huston, Houston, Tex., assignor to Schlumberger Well Surveying Corporation, Houston, Tex., a corporation of Delaware Application November 12, 1947, Serial No. 785,270

17 Claims. (Cl. 177—351)

This invention relates to new and improved mutual inductance systems which are phase selective and insensitive to variations in the frequency of the source of electrical energy employed.

Mutual inductance systems are well known and generally comprise primary winding means energized from a suitable source of alternating current, preferably of constant amplitude and frequency, and secondary winding means connected to suitable indicating means. Systems of this type are used for many purposes, such as detecting metal embedded in relatively nonconducting materials as in locating buried mines, inspecting lumber or other opaque material, and in geophysical work. Mutual inductance systems of this type have also been used as position or condition indicators, such as are employed in telemetering operations. For this application, displacements representative of the position or condition to be indicated are used to change the position of a magnetic member disposed in inductive relation to the primary and secondary windings of the system, thereby changing the coupling therebetween.

Mutual inductance systems of the above character used heretofore have not been found satisfactory because of the difficulty encountered in meeting requirements for frequency stability and phase selectivity in certain applications. Frequency stability of the degree required for precise work can be achieved only at considerable expense and by adding to the bulk of the equipment. The attainment of satisfactory phase selectivity, likewise, adds considerably to the bulk of the equipment.

Accordingly, the principal object of the present invention is to provide new and improved mutual inductance systems which are substantially insensitive to frequency variations over a relatively wide range.

Another object of the invention to provide a mutual inductance system which is phase selective.

A further object of the invention is to provide a mutual inductance system wherein the electrical response may be made linear with respect to a mechanical movement.

A further object of the invention is to provide a telemetering, condition, or position reporting system which may be easily adapted to provide an output signal that is any desired function of the state being reported.

Still another object of the invention is to provide a new and improved drill hole gauge embodying mutual inductance apparatus constructed according to the invention.

The objects of the invention are attained by impressing upon the primary winding of a mutual inductance system electrical energy having a wave form which produces a magnetic flux whose rate of change is substantially constant during each half-cycle and whose rate of change is independent of frequency. As the voltage induced in the secondary winding, or windings, is a function only of the time rate of change of flux linking them, then the output is constant over each half-cycle and independent of frequency.

Additional objects and advantages of the invention will be apparent from the following detailed description of several representative embodiments, taken in conjunction with the accompanying drawings, in which:

Figure 1 illustrates schematically a mutual inductance system constructed according to the present invention;

Figure 1a is a graph showing, in idealized form, the several voltage wave forms appearing in the system illustrated in Figure 1;

Figure 2 is a schematic diagram of a modified mutual inductance system responsive to rotary motion representative of a position or condition to be reported;

Figure 4:
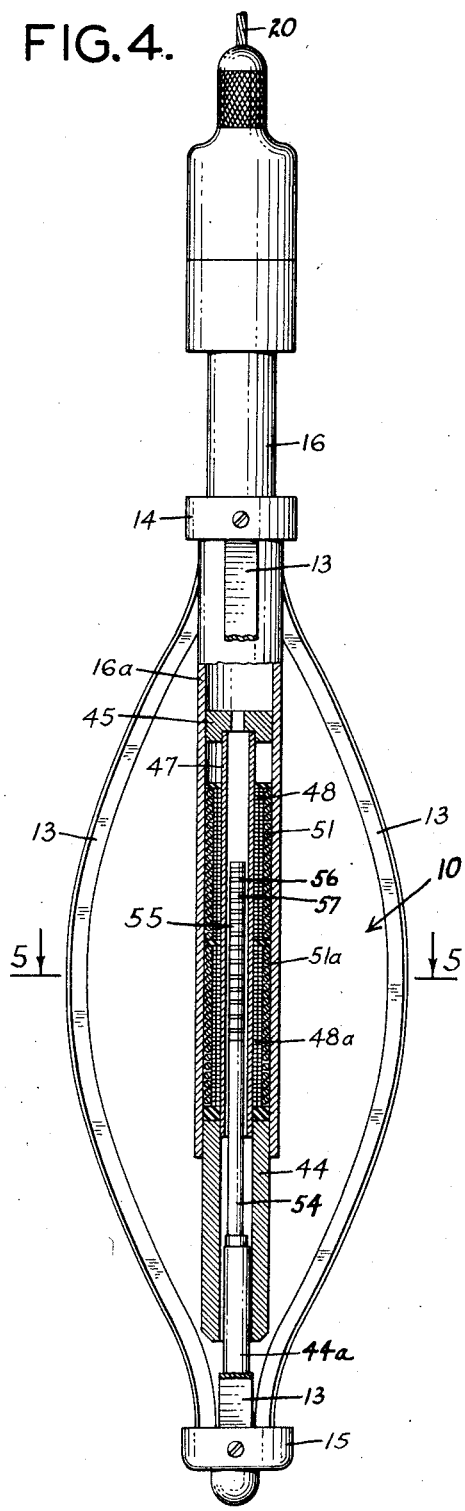
Figure 4 is a schematic diagram of a drill hole gauge embodying mutual inductance apparatus constructed according to the invention.

For purposes of illustration, it will be assumed in the following description that the quantity to be indicated is available as either a linear or rotary mechanical motion which can be used to adjust the position of a magnetic member with respect to the windings of a mutual inductance system to vary the coupling therebetween.

Referring now to Figure 1, a mutual inductance system 50 is shown which may comprise, for example, a primary winding 49 and a secondary winding 53 divided into two halves 51 and 51a. Preferably, the winding halves 51 and 51a are identical and they are connected in series opposition, as shown, so that the output is zero when the coupling between each half of the secondary winding 53 and the primary winding 49 is the same.

One end of the primary winding 49 may be connected to ground at 66, as shown, and the other end may be connected by a conductor 65 to any suitable source of electrical energy $E_2$ having a time rate of change which is substantially constant during each half-cycle and which is substantially independent of frequency. The voltage $E_2$ may be, for example, a saw-tooth voltage developed across a condenser 63 in a conventional integrating circuit including a series resistor 62 and which receives a square wave voltage input $E_1$. The square wave voltage input $E_1$ may be produced in any suitable manner, as, for example, by periodically reversing the connections between the terminals of a battery 59 and the conductors 60 and 61 by means of a conventional commutator 58 driven by a motor "M." The commutator 58 may be of the type disclosed in the Patent No. 1,813,845 to Gish, for example.

Disposed in inductive relation with the primary winding 49 and the secondary winding 53 of the system 50 is a magnetic member 55 carried by a rod 54 which is adapted to be displaced longitudinally in accordance with variations of the position or condition to be indicated. In this fashion, the coupling between the halves 51 and 51a of the secondary winding 53 and the primary winding 49 is varied. The output from the secondary winding 53 of the system 50 is transmitted through the conductors 67 and 68 to suitable indicating means which may comprise, for example, a conventional commutator 69, driven in synchronism with the commutator 58 by the motor "M," and a recording type indicating instrument 70.

Figure 6:
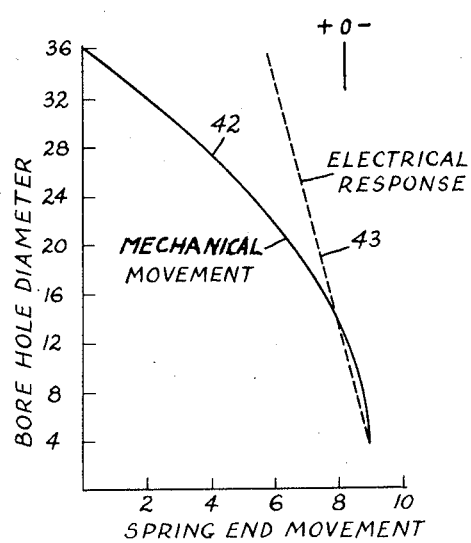
Figure 6 is a graph showing the relation between a condition or position to be reported and the electrical response of the circuit shown in Figure 1.

In certain cases, the relation between the condition or position to be indicated and the response of the indicating instrument 70 may be non-linear. For example, the relation between the diameter of a bore hole and the mechanical output of a drill hole gauge of the type shown in Figure 4, for example, may be non-linear, as shown by the curve 42 in Figure 6. The relation between the resulting mechanical displacement of the magnetic member 55 and the electrical response of the indicating instrument 70 may also not be linear. A linear relationship, however, exemplified by the curve 43 in Figure 6, is preferred between the electrical response of the indicating instrument 70 (Figure 1) and the bore hole diameter. Such a linear relationship may be obtained by incorporating suitable compensating electrical elements in the circuit. Preferably, however, such compensation may be effected by forming the magnetic member 55 out of alternate disc-like pieces 56 and 57 made of magnetic and non-magnetic material, respectively, of proper thickness and magnetic properties to produce the desired compensation.

By effecting compensation in the above manner, a substantially cylindrical magnetic member 55 may be employed, which is a material advantage. However, other non-cylindrical shapes may be used, if desired. It will be readily apparent that by proper design of the magnetic member 55, a wide variety of compensatory effects can be produced. Hence, any desired relationship between the variable to be indicated and the readings of the indicating instrument 70 can be obtained.

In operation of the embodiment illustrated in Figure 1, the saw-tooth voltage wave $E_2$ applied to the primary winding 49 of the system 50 causes a corresponding current to flow therethrough. The magnetic flux set up by the primary winding 49 is in phase with the current and it induces voltages in the two halves 51 and 51a of the secondary winding 53, the magnitudes of which depend on the relative coupling between the secondary winding halves 51 and 51a and the primary winding 49, as determined by the position of the magnetic member 55. Since these induced voltages are a function of the time rate of change of the magnetic flux set up by the primary winding 49, they are square wave voltages of the same frequency as the saw-tooth voltage $E_2$ exciting the primary winding 49.

When the position of the magnetic member 55 is such that equal coupling exits between the two halves 51 and 51a of the secondary winding 53 and the primary winding 49, the induced voltages are substantially equal in magnitude and since the two halves 51 and 51a are connected in series opposition, the output of the secondary winding 53 is zero. For positions of the magnetic member 55 above the position of equal coupling, the output of the secondary winding 53 is a square wave voltage of one phase with respect to the primary current, and for positions below the position of equal coupling, the output of the secondary winding 53 is a square wave voltage that is 180° out of phase with said square wave voltage of one phase. The square wave output from the secondary winding 53 of the system 50 is converted by the commutator 69 into a pulsating D. C. voltage $E_4$ which is impressed upon the terminals of the indicating instrument 70. The current through the indicating instrument thus has different polarities for positions above and below the position of equal coupling.

The several voltage wave forms in the system described above are shown in idealized form in Figure 1a. The phase relations shown are essentially correct although variations may occur in practice because of phase delays. Also, in practice, the wave forms may not be as sharply defined as in this ideal representation.

In order to eliminate undesirable transient effects, the non-conducting segments of the commutator 69 should preferably be made considerably larger than those of the commutator 58, in accordance with good engineering practice. As a practical matter, the non-conducting segments of the commutator 69 may occupy approximately 50% of its periphery so that the measuring circuit will be completed only approximately half of each cycle. The indicating instrument 70, preferably a recording galvanometer, should therefore be properly damped. Since, under these conditions, the readings of the galvanometer 70 will be approximately half the peak value of the square wave output from the secondary winding 53, it may be desirable to increase the current flowing in the circuit of the primary winding 49 suitably to provide an indication of sufficient magnitude.

For a commutator 69 of the type described above, the current in the primary winding 49 might desirably be doubled, for example.

If there are non-magnetic conducting elements such as the rod 54, for example, in the vicinity of the mutual inductance system 50, eddy currents will be induced in them. These eddy currents will have a square wave form and will be in phase with the square wave voltages induced in the halves 51 and 51a of the secondary winding 53. These eddy currents will produce a magnetic flux in phase therewith which will induce in the two halves 51 and 51a of the secondary winding 53 voltage peaks when the square wave magnetic flux changes from a peak value of one polarity to a peak value of opposite polarity. The apparatus is so adjusted that these peak voltages do not occur during the measuring part of the cycle of the commutator 69 so that they are not indicated by the instrument 70. They do appear with the rest of the transients which are taken out by the dead spots of the commutator 69.

As indicated above, when the position of the magnetic member 55 is such that the coupling between the two halves 51 and 51a of the secondary winding 53 is equal, the output of the secondary winding 53 is zero. It will be apparent, therefore, that the indicating instrument 70 may be provided with a center zero so that it can measure both positive and negative voltages corresponding to positions of the magnetic member 55 above and below the position of equal coupling.

If the variable quantity to be indicated is available as a rotary motion, the embodiment illustrated in Figure 2 may be employed. In this form, the magnetic member preferably comprises a substantially semi-circular element 37 made of magnetic material and rotatable about an axis 38. The primary winding 49 is preferably divided into two series connected halves 49a and 49b which are associated with the two halves 51 and 51a of the secondary winding 53, respectively.

When the coupling between each of the primary winding halves 49a and 49b and the corresponding secondary winding halves 51 and 51a is equal, the voltages induced in the latter are substantially equal and the resultant output of the secondary winding 53 is zero. Rotation of the semi-circular element 37 in one direction increases the voltage induced in one-half of the secondary winding 53 and decreases it in the other half, whereas, rotation in the opposite direction produces an opposite effect.

Figure 3:
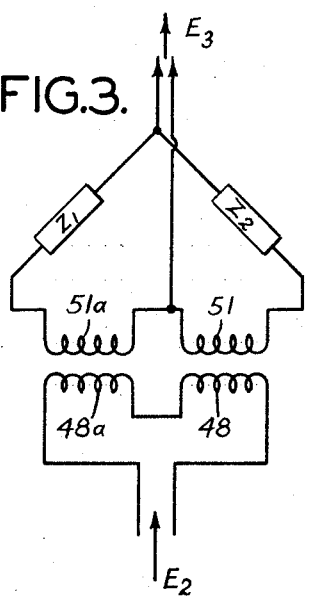
Figure 3 illustrates schematically a mutual inductance bridge constructed according to the invention.

Figure 3 shows a system which employs a mutual inductance bridge. A triangular voltage wave $E_2$ is applied to the primary windings 48a and 48 connected in series. The corresponding secondary windings 51a and 51 are connected in series adding.

Each secondary winding constitutes one arm of a bridge completed by appropriate impedances $Z_1$ and $Z_2$ in the other two arms. The output leads of the bridge are connected to the junction $Z_1$—$Z_2$ and to the junction 51a—51. Any potential appearing between the output leads will have a square wave form. It may be indicated on a measuring instrument after passing through a phase selective arrangement such as the commutator of Figure 1.

In this manner, mutual inductances may be compared wherein the results are insensitive to frequency changes. By the selections of appropriate phase relationships between the applied wave $E_2$ and the output wave $E_3$, the effects of eddy currents in the two mutual inductances can be either eliminated or made dominant. Comparison between measurements made with different phase relationships will therefore permit an evaluation of the effects of eddy currents. This may be valuable when comparing mutual inductance systems or when detecting flaws or determining the uniformity in metal.

The mutual inductance bridge shown in Figure 3 can also be adapted for telemetering in apparatus of the types illustrated in Figues 1 and 2. It will suffice to include a magnetic member to affect the mutual inductance in the bridge.

Figure 5:
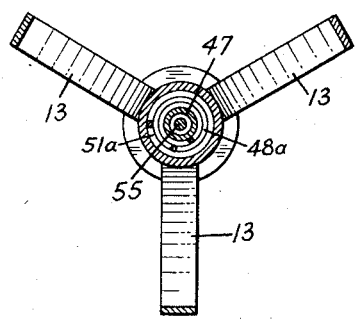
Figure 5 is a view in transverse section taken along line 5—5 of Figure 4 looking in the direction of the arrows.

Figures 4 and 5 show a drill hole gauge embodying the novel mutual inductance apparatus of the invention. Drill hole gauges of this general type are disclosed in the copending application of Jean C. Legrand, Serial No. 776,282, filed September 26, 1947, for "Drill Hole Gauge."

Referring to Figures 4 and 5, the drill hole gauge 10 comprises a plurality of angularly spaced, arched springs 13 which are secured at their upper and lower extremities, respectively, to the collar 14 and a hub-like member 15. Any desired number of springs 13 may be used, three being shown in Figure 4. The collar 14 is slidably mounted on a tubular member 16 which is secured within another tubular member 16a, at the lower end of which is secured a third tubular member 44. The hub-like member 15 carries a piston 44a which is slidably received within the lower end of the tubular member 44. The lower face of the member 44 forms a stop for the hub-like member 15 and the upper edge of the tubular member 16a forms a stop for the upper collar 14, as shown.

With the construction described above, it will be apparent that when the bore hole gauging apparatus 10 is being lowered through a bore hole, the hub-like member 15 will be held against movement by the lower end of the tubular member 44 while the collar 14 will be free to move longitudinally, in accordance with variations in the size of the bore hole. Conversely, while the bore hole gauging apparatus 10 is being raised in the bore hole, the collar 14 will remain fixed against the upper end of the tubular member 16a and the lower collar 15 will move longitudinally according to variations in the size of the bore hole.

Within the tubular member 16a is disposed a disc-like support 45 which cooperates with the tubular member 44 to provide a mounting for a tube 47, preferably made of nonmagnetic material. Wound on the tube 47 are a pair of adjacent coils 48 and 48a which are adapted to be connected in series to form the primary winding 49 (Figure 1) of the mutual inductance system 50. Over the coils 48 and 48a are wound the two halves 51 and 51a which form the secondary winding 53 of the system 50, as shown in Figure 1.

Secured on the piston 44a (Figure 4) is the rod-like member 54 having the plunger 55 secured at its upper end and extending within the tube 47. The plunger 55 preferably comprises a plurality of adjacent washers 56 and 57 of magnetic and nonmagnetic material, respectively, secured to the rod 54 in any suitable manner, the relative numbers and sizes of which are so selected as to compensate for any non-linearity in the relationship between variations in size of the bore hole and the electrical indications obtained, for example.

The electrical connections from the primary and secondary windings have not been shown in Figure 4. In practice, such connections run to conductors 65, 67 and 68 of Figure 1. These conductors are disposed within a supporting cable 29 which extends to the surface of the earth where they are connected as shown in Figure 1 to the measuring system and to the source of electrical energy, the latter also being located at the surface of the earth. The lower end of the coil portion 48a may be grounded to the apparatus as in Figure 1, or it may be connected by another conductor 65a in the supporting cable 29, as in Figure 2.

Figure 7:
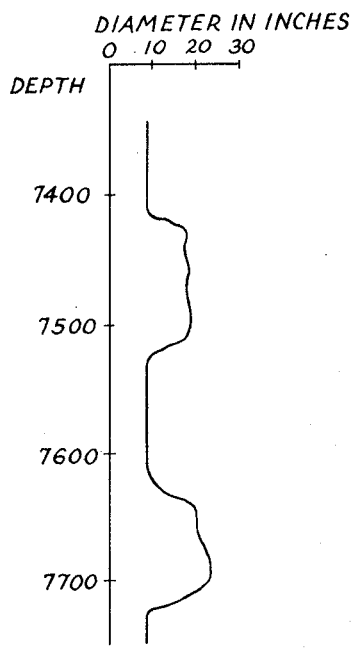
Figure 7 is a representation of a typical curve obtained with the apparatus shown in Figure 4 and providing a record of bore hole diameter at different depths.
Figure 7A:
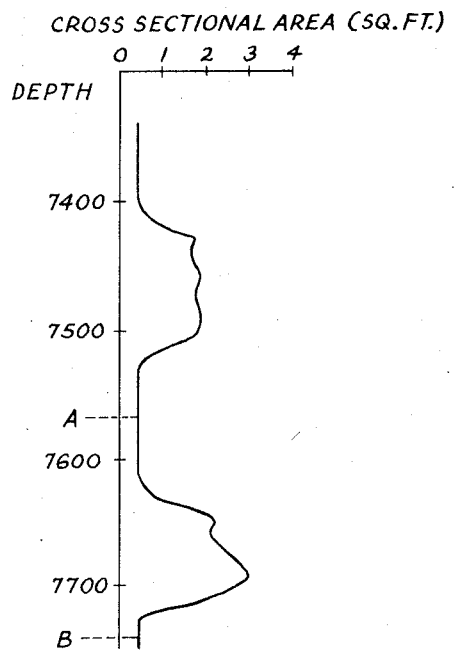
Figure 7A is a representative curve obtained with the Figure 4 apparatus of the cross-sectional area of a bore hole as a function of depth.

If the indications of the instrument 70 (Figure 1) are recorded or plotted, a graph of the general shape shown in Figure 7 will be obtained with the apparatus of Figures 4 and 5. This graph gives the diameter of the bore hole as a function of the depth. If desired, however, a curve of the cross-sectional area of the bore hole may be obtained, as shown in Figure 7A. This may be readily accomplished by proper calibration of the meter or recording instrument, bearing in mind that the area varies in accordance with the square of the diameter of the bore hole. Alternatively, the magnetic plunger 55 may be so designed that the output of the secondary winding 53 of the mutual inductance system 59 varies as the square of the bore hole diameter.

It has been found useful in drill hole operations to record a curve showing variations in the characteristics of the formations at different depths such as a curve of spontaneous potentials, for example, simultaneously with the gauging operation. This may be accomplished by connecting a conventional D. C. recording instrument 81 (Figure 1) located at the surface of the earth to ground at 82 and by the conductor 80 to the cable conductor 65, so that it provides indications of variations in spontaneous potentials at the ground electrode 66 in the bore hole. A low pass filter 80a may be connected in series with the recorder 81, to block the power frequencies. Further details of such measurements are disclosed in Schlumberger Patent No. 1,913,293 and Doll Patent No. 2,357,178.

Figures 8, 8A:
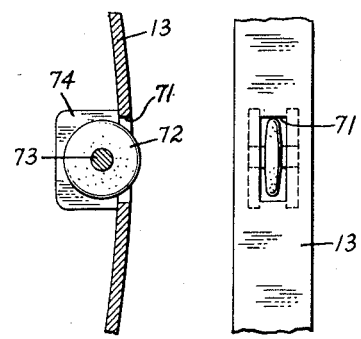
Figure 8 is a partial side view in longitudinal section of a wall engaging element for use with the drill hole gauge shown in Figure 4.
Figure 8A is a front view of the wall engaging element shown in Figure 8.

In regions where highly abrasive formations may be encountered, it may be desired to mount a small wheel on each of the springs 13 at the point where they contact the formation, as shown generally in Figures 8 and 8A. Referring to Figure 8, a suitable slot 71 may be formed in each of the springs 13 substantially at the point where it would contact a formation and a wheel 72 may be mounted so as to extend therethrough into engagement with the formation, as shown. The wheel 72 may be supported in any conventional manner, as for example, on an axle 73 mounted between a pair of plates 74, welded or otherwise secured to the springs 13, as shown.

Preferably, the wheel 72 should be made of very hard material so as to minimize wear. The axle 73 may be made of some softer material, such as cold-rolled steel or brass. In order to forestall any possibility of the instrument hanging under a sharp ledge or casing, it is desirable to have appreciably less than half of the wheel 72 protruding beyond the spring 13.

As shown in Figure 4, the rod-like member 54 and the plunger 55 are freely movable within the tubular member 47 and packing glands or the like are not required to keep out the bore hole liquid. The tubular member 47 may be made strong enough to withstand the pressure of the bore hole liquid and the annular cavity containing the coils 48, 48a and 51, 51a may then be sealed from the outside fluid. Alternatively, these may be vacuum impregnated and baked to render them waterproof. Small holes (not shown) may be formed in the tubular member 47 to equalize the pressures on either side thereof. If desired, a screen (not shown) may be added to prevent large particles of sand or rock from getting into the apparatus.

The volume of any section of a bore hole such as that between the points A—B on Figure 7A, for example, can be readily determined by measuring the area under the curve between these points in any known manner and applying a constant determined from the depth scale and the cross-sectional area scale for the curve. For example, one inch on the horizontal cross-sectional area scale might correspond to 3 square feet and one inch on the depth scale might correspond to 100 feet. The constant would then be $3 \times 100 = 300$. Assuming that the area under the curve between the points A—B is .8 square inch, the volume between these two points would be $.8 \times 300 = 240$ cubic feet.

It will be apparent from the foregoing that the invention provides highly effective mutual inductance systems which are substantially independent of the frequency of the exciting voltage and are phase selective. By exciting the primary winding of the mutual inductance system with an electrical wave having, during each half cycle, a time rate of change which is substantially constant over a range of frequencies, the rate of change of flux linking the primary and secondary windings is substantially constant, regardless of the frequency of the exciting voltage. Hence, the voltages induced in the secondary winding are substantially independent of the frequency.

It will be further understood that the invention provides simple and highly effective apparatus for gauging the diameter or size of the bore hole. The apparatus has few moving parts, all of which can withstand any fluid and pressure in the bore hole without fear of damage. In addition, the apparatus can be raised or lowered in the bore hole at will, with ease and without twisting of the supporting cable.

The several embodiments described in detail above are obviously susceptible of modification within the scope of the invention. For example, the embodiment illustrated in Figure 1 may also be used where the available quantity appears as a rotary motion merely by providing a rack and pinion for converting the rotary motion to linear motion. Any other suitable means may be employed for providing a wave form having a time rate of change that is substantially constant, during each half-cycle, over a range of frequencies. Similarly, other suitable means may be provided for phase selection between the input and output circuits. Other changes in form and detail may be made within the scope of the following claims.

I claim:

1. In a mutual inductance system having primary and secondary winding means, the coupling therebetween being variable in response to a variable to be observed, the combination of means for exciting said primary winding means with a periodically variable voltage having a substantially constant rate of change during at least a portion of a half-cycle, and indicating means responsive to voltages of given phase with respect to said periodically variable voltage and as induced in said secondary winding means indicative of the variable to be observed.

2. In a mutual inductance system having primary and secondary winding means, the combination of means for exciting said primary winding means with a periodically variable voltage having a substantially constant rate of change during a half-cycle, means responsive to voltages induced in said secondary winding means, and means for varying the coupling between said primary and secondary winding means in response to a function to be measured.

3. In a mutual inductance system having primary and secondary winding means, the combination of a source of square wave voltage, integrating means receiving said square wave voltage and supplying to said primary winding means a corresponding periodically variable voltage having a substantially constant rate of change during a half-cycle, means responsive to voltages induced in said secondary winding means by said primary winding means, and means for varying the coupling between said primary and secondary winding means in response to a function to be measured.

4. In a mutual inductance system having primary winding means and secondary windings connected in series opposition, the combination of means for exciting said primary winding means with a periodically variable voltage having a substantially constant rate of change during a half-cycle, thereby inducing in said secondary windings square wave voltages that are substantially independent of the frequency of said periodically variable voltage, means for varying the coupling between at least one of said respective secondary windings and said primary winding means in response to a function to be measured to produce a resultant secondary voltage that varies in accordance with variations in said coupling, and indicating means responsive to said resultant voltage.

5. In a mutual inductance system having primary winding means and secondary windings connected in series opposition, the combination of means for exciting said primary winding means with a periodically variable voltage having a substantially constant rate of change during a half-cycle, thereby inducing in said secondary windings square wave voltages that are substantially independent of the frequency of said periodically variable voltage, a movable member of magnetic material associated with said primary winding means and secondary windings for varying the coupling therebetween to produce corresponding variations in said square wave voltages, and means for moving said movable member with respect to said respective secondary windings and said primary winding means to produce a resultant secondary voltage that is zero for one position of said magnetic member and has one phase with respect to the primary current and another phase 180° therefrom, at positions on opposite sides of said one position, respectively, and indicating means providing readings of one polarity corresponding to resultant secondary voltages of said one phase and readings of opposite polarity corresponding to resultant secondary voltages of said another phase.

6. In a mutual inductance system having primary winding means and a pair of secondary windings connected in series opposition, the combination of a source of direct current voltage, first commutator means for converting said direct current voltage to a square wave voltage, an electrical integrating circuit receiving said square wave voltage and supplying a substantially linear saw-tooth voltage to said primary winding means, thereby inducing in said secondary windings square wave voltages having intensities that are substantially independent of frequency, a member of magnetic material operatively associated with said primary winding means and said secondary windings for changing the coupling therebetween in accordance with displacement thereof, second commutator means operated in synchronism with said first commutator means for rectifying the combined voltages induced in said secondary windings, and indicating means responsive to the output of said second commutator means.

7. In a mutual inductance system having primary winding means and secondary winding means, the combination of means supplying to said primary winding means a periodically variable voltage having a substantially constant rate of change during a half-cycle, a rotatable member of magnetic material associated with said primary and secondary winding means for modifying the coupling therebetween in accordance with angular displacement of said member, and indicating means responsive to the output of said secondary winding means indicative of angular displacement of said rotatable member.

8. In a mutual inductance system having a pair of series connected primary windings and a pair of corresponding secondary windings connected in series opposition, a member of magnetic material having one end associated with one primary winding and the corresponding secondary winding and having another end associated with the other primary winding and the corresponding secondary winding for varying the coupling between the respective primary windings and the corresponding secondary windings, means supplying to said primary windings a periodically variable voltage having a substantially constant rate of change during a half-cycle, and indicating means responsive to the output of said secondary windings.

9. In a telemetering system, the combination of a mutual inductance system having primary and secondary winding means, a source of periodically variable voltage connected to said primary winding means, said voltage having a substantially constant rate of change during a half-cycle, a member of magnetic material operatively associated with said primary and secondary winding means and displaceable in accordance with a variable to be observed, for varying the coupling between said primary and secondary winding means, and remotely located indicating means connected to said secondary winding means.

10. In a telemetering system, the combination of a mutual inductance system having a primary and secondary winding means, a source of periodically variable voltage connected to said primary winding means, said voltage having a substantially constant rate of change during a half-cycle, a member of magnetic material operatively associated with said primary and secondary winding means and displaceable in accordance with a variable to be observed, for varying the coupling between said primary and secondary winding means, remotely located indicating means connected to said secondary winding means, and means interposed between said secondary winding means and said indicating means for rendering the latter responsive only to signals of given phase with respect to said periodically variable voltage.

11. In a telemetering system, the combination of a mutual inductance system having primary winding means and a pair of secondary windings connected in series opposition, a remotely located source of direct current voltage, first commutator means located near said source for converting direct current voltage therefrom to square wave voltage, electrical integrating means receiving said square wave voltage and supplying to said primary winding means a substantially linear saw-tooth voltage, thereby inducing in said secondary windings square wave voltages having intensities that are substantially independent of frequency, a member of magnetic material operatively associated with said primary winding means and secondary windings, and displaceable in accordance with a variable to be observed, for varying the coupling between said primary winding means and said secondary windings, second remotely located commutator means operated in synchronism with said first commutator means for rectifying the output of said secondary windings, and indicating means near said second commutator means and receiving the output thereof.

12. In apparatus for gauging the size of a hole comprising mechanical means insertable in the hole and providing a mechanical output representative of the size of a hole, the improvement comprising a mutual inductance system having a primary winding and a secondary winding, means for exciting said primary winding with a saw-tooth voltage, indicating means connected to said secondary winding, and a member of magnetic material movable in response to the output of said mechanical means for varying the coupling between said primary and secondary windings in accordance with the output of said mechanical means.

13. In apparatus for gauging the size of a bore hole comprising mechanical means insertable in the hole and providing a mechanical output representative of the size of a hole, the improvement comprising a mutual inductance system having primary and secondary winding means, means for exciting said primary winding means with a periodically variable voltage having a substantially constant rate of change during a half-cycle, indicating means responsive to voltages induced in said secondary winding means, and means movable in accordance with the output of said mechanical means for varying the coupling between said primary and secondary winding means.

14. In a mutual inductance bridge having a plurality of arms and an output diagonal, the combination of primary winding means and secondary winding means, said secondary winding means being connected in at least one of said arms, means supplying to said primary winding means a periodically variable voltage having a substantially constant rate of change over a half-cycle, means connected across said output diagonal for selecting from the output of said bridge only signals of given phase with respect to said periodically variable voltage, and means for indicating said signals of given phase.

15. In a mutual inductance bridge having a plurality of arms and an output diagonal, the combination of primary winding means and separate secondary winding means, said separate secondary winding means being connected in two adjoining arms of said bridge, respectively, means supplying to said primary winding means a periodically variable voltage having a substantially constant rate of change over a half-cycle, phase responsive means connected across said bridge output diagonal for selecting from the output of said bridge only signals of given phase with respect to said periodically variable voltage, and means for indicating said signals of given phase.

16. In a mutual inductance system having primary winding means disposed in inductive relation to secondary windings connected in series opposition and a movable magnetic member for varying the coupling between said secondary windings and said primary winding means in complementary fashion on either side of a position of equal coupling, the combination of indicating means connected to said oppositely connected secondary windings, and phase selective rectifying means interposed between said indicating means and said secondary windings for supplying current of one polarity to said indicating means when said magnetic member is on one side of said position of equal coupling, and for supplying current of different polarity to said indicating means when the magnetic member is on the other side of said position of equal coupling.

17. In apparatus for gauging the size of a hole comprising mechanical means insertable in the hole and providing a mechanical output which is a function of the size of the hole, the improvement comprising a mutual inductance system having primary and secondary winding means, a source of periodically variable voltage connected to said primary winding means, said voltage having a substantially constant rate of change during a half-cycle, a member operatively associated with said winding means and movable in response to the output of said mechanical means for varying the coupling between said primary and secondary winding means, said member having portions of magnetic material and portions of non-magnetic material, said portions being so selected and shaped as to vary the coupling between said primary and secondary winding means according to a function of the said mechanical output representative of the size of the hole, and indicating means responsive to the output of said secondary winding means indicative of a function of the variable to be observed.

OWEN H. HUSTON.

REFERENCES CITED

The following references are of record in the file of this patent:

UNITED STATES PATENTS

| Number | Name | Date |
|---|---|---|
| 1,708,354 | Cabot | Apr. 9, 1929 |
| 2,170,527 | Culbertson | Aug. 22, 1939 |
| 2,196,809 | Hoadley | Apr. 9, 1940 |
| 2,235,533 | Roberts | Mar. 18, 1941 |
| 2,267,110 | Kinley et al. | Dec. 23, 1941 |
| 2,283,925 | Harvey | May 26, 1942 |
| 2,324,964 | Thompson | July 20, 1943 |
| 2,348,643 | Poole | May 9, 1944 |
| 2,369,909 | Mestas | Feb. 20, 1945 |
| 2,420,539 | Hornfeck | May 13, 1947 |
| 2,430,757 | Conrad | Nov. 11, 1947 |
| 2,469,137 | Strong | May 3, 1949 |